United States Patent

Imanaka et al.

[11] Patent Number: 5,868,623
[45] Date of Patent: Feb. 9, 1999

[54] RESILIENT ELEMENT HAVING AN ELASTIC PORTION AND SEAT PORTIONS FOR USE IN A VIBRATION DAMPING DEVICE

[75] Inventors: Hideyuki Imanaka, Moriguchi; Yasuyuki Hashimoto, Neyagawa; Hiroshi Teramae, Nara, all of Japan

[73] Assignee: Exedy Corporation, Neyagawa, Japan

[21] Appl. No.: 874,540

[22] Filed: Jun. 13, 1997

Related U.S. Application Data

[62] Division of Ser. No. 660,950, Jun. 12, 1996, Pat. No. 5,690,553, which is a division of Ser. No. 424,012, Apr. 18, 1995, abandoned.

[30] Foreign Application Priority Data

Apr. 25, 1994 [JP] Japan .................................. 6-086847

[51] Int. Cl.⁶ ........................................................ F16D 3/64
[52] U.S. Cl. ................................ 464/68; 464/85; 192/211
[58] Field of Search .................................. 464/68, 83, 85, 464/87; 192/209, 210, 211

[56] References Cited

U.S. PATENT DOCUMENTS

2,727,725  1/1955  Werner .
4,499,981  2/1985  Nagano .

*Primary Examiner*—Donald P. Walsh
*Assistant Examiner*—Emmanuel M. Marcelo
*Attorney, Agent, or Firm*—Shinjyu An Intellectual Property Firm

[57] ABSTRACT

A torsion damper for a clutch disc is disposed in window holes provided in power input and output rotating elements of the clutch disc, for elastically coupling the power input and output rotating elements in a direction of their rotation. The torsion damper includes a pair of seat elements 11 and a rubber element 12 therebetween. In one embodiment, the rubber element 12 is positioned between both the seat elements 11 and is capable of expanding and contracting. The rubber element includes a projection 20 and a through-hole 16 is provided in each of the seat elements 11.

2 Claims, 8 Drawing Sheets

RESILIENT ELEMENT HAVING AN ELASTIC PORTION AND SEAT PORTIONS FOR USE IN A VIBRATION DAMPING DEVICE

This application is a division of application Ser. No. 08/660,950, filed Jun. 12, 1996 now U.S. Pat. No. 5,690,553 which is a division of application Ser. No. 08/424,012 filed Apr. 18, 1995, now abandoned.

BACKGROUND OF THE INVENTION a) Field of the Invention

The present invention relates to a torsion damper for a clutch disc, and more particularly, it relates to a torsion damper for a clutch disc for elastically coupling at least two portions of a clutch disk.

b) Description of the Related Art

A clutch disc is used, for example, in a clutch disc assembly which is positioned between an engine and a transmission in an automobile. The clutch disc has a clutch plate and a retaining plate working as a power input rotating element, a spline hub working as a power output rotating element, and an elastic element for elastically coupling both of them.

For the elastic element, generally, a coil spring (torsion spring) is used, and is usually disposed in window holes formed in each of the power input and output rotating elements. Torque from the clutch plate and the retaining plate is transmitted from end surfaces of the window holes in the plates via the torsion spring to the spline hub. During power transmission, the torsion spring is compressed and may expand in a direction of the rotation absorbing vibrations and fluctuations in the power transmitted in response to relative rotary displacement between the clutch plate and the retaining plate.

Alternatively, in some clutch discs, a single block of torsion rubber is used with the coil spring, serving as an additional elastic element to optimize torque transmission and vibration dampening. The torsion rubber is positioned concentric with the torsion spring and is comprised of a rubber element capable of expanding and contracting in a direction of rotation in response to relative rotary displacement between the power input and output rotating elements. In some clutch discs, seat elements are provided at opposite ends of the rubber element and made of hard material such as resin. One end surface of each seat element works as a contact surface in contact with either the clutch plate or the retaining plate while the other end surface is coupled to an end of the rubber element.

The torsion rubber is compressed similar to the torsion spring, and in this situation, the rubber element tends to expand outward in radial directions. The seat element and the rubber element sometimes distort relative to each other in radial directions in the clutch disc corresponding to relative torsional movement between the power input and output rotating elements. In such a case in the prior art arrangement, since shearing force works in an adhesion surface where an end surface of the rubber element adheres to the seat element, the rubber element may crack or the adhesion surface may be broken off. Especially after a long term of use, fatigue failure due to repetitive compression may arise in the vicinity of the contact surface.

In the prior art arrangement, an adhesion step is required in a fabricating process, and this leads to an increase in fabrication cost. Moreover, since adhesion strength must be attained to a specified extent, this results in materials of the rubber element and seat element being restricted, and a material cost may increase.

SUMMARY OF THE INVENTION

Accordingly, it is an object of the present invention to assemble a torsion rubber of a rubber element and a seat element, without adhesive.

It is another object of the present invention to assemble an element without adhesive and to enhance durability.

It is further another object of the present invention to have a larger variety of choice of materials of the rubber element and the seat element.

It is still another object of the present invention to reduce a cost.

It is yet another object of the present invention to prevent as much as possible the rubber element and the seat element from being separated from each other.

It is still yet another object of the present invention to attain smooth contact of the rubber element with the seat element in receiving compression force.

Generally a torsion damper for a clutch disc in accordance with the present invention is placed in window holes formed in each of a power input and output rotating elements for elastically coupling the power input and output rotating elements in a direction of their rotation. The torsion damper has a pair of seat elements and a rubber element. The pair of the seat elements are spaced apart by a predetermined interval. The rubber element is capable of expanding and contracting, positioned between both the seat elements. The rubber element is made of a non-metallic elastic material. Such materials include natural rubber, and synthetic rubber material, such as those made from petroleum products or the like.

In one aspect of the present invention, a torsion damper for a clutch disc includes a pair of seat elements and an elastic non-metallic element disposed between the seat elements in mechanical engagement therebetween in the absence of an adhesive, limiting relative movement between the seat elements and the rubber element. The seat elements and the elastic non-metallic element include at least one aperture formed in one of the seat elements or the elastic non-metallic element and an extending portion formed on the other of the seat elements or the elastic non-metallic element extending into the aperture, and fixed therein by friction engagement.

In another aspect of the invention, at least one aperture is provided with an annular groove and the extending portion is provided with an annular protrusion which engages the groove.

In another aspect of the invention, each of the seat elements is provided with an aperture and the elastic non-metallic element is provided with opposing extending portions which extend into the seat element apertures fixing the seat elements to the elastic non-metallic element by friction engagement therebetween.

In another aspect of the invention, the seat element apertures are provided with an annular groove and each of the extending portions are provided with an annular protrusion which engage the grooves respectively.

In another aspect of the invention, each of the seat element apertures has a tapered diameter such that near the surface of the seat element the aperture has a smaller diameter than within the aperture and the elastic non-metallic element opposing extending portions are tapered to compliment the taper of the seat element apertures.

In an alternate embodiment of the invention, the elastic non-metallic element is provided at least one aperture and each of the seat elements is provided an extending portion which extends into the aperture, fixing the seat elements to the elastic non-metallic element by friction engagement therebetween.

In another aspect of the alternate embodiment, the extending portion on each of the seat elements is provided with an annular protrusion and the aperture is provided with corresponding annular grooves which engage the protrusions.

In a variation of the alternate embodiment, the aperture has a tapered diameter such that near the surface of the elastic non-metallic element the aperture has a smaller diameter than within the aperture and each of the seat element extending portions is tapered to compliment the taper of the apertures.

In yet another alternate embodiment of the present invention, each of the seat elements is formed with an outer radial lip which at least partially encloses a portion of the elastic non-metallic element.

In yet a further alternate embodiment, the elastic non-metallic element has a generally spherical contour and opposing surfaces of each of the seat elements is provided with a generally spherical concave surface in contact with the elastic non-metallic element. The diameter of the seat element spherical concave surface is larger than the diameter of the elastic non-metallic element spherical contour. An optional feature to this embodiment may include a first of the seat elements being provided with an elongated cylindrical lip which extends around a second of the seat elements enclosing the elastic non-metallic element.

In still a further embodiment of the present invention, the elastic non-metallic element includes axial extensions which extend around at least of portion of each of the seat elements.

In still a further embodiment of the present invention, the seat elements and the elastic non-metallic element are formed with central apertures and a fixing element extends through the central apertures binding the seat element with the elastic non-metallic element confined therebetween.

The torsion damper for a clutch disc according to the present invention is compressed between the power input rotating element and the power output rotating element in transmitting torque, and the rubber element expands in radial directions while the damper is being compressed. Since the rubber element and the seat elements engages with each other in their respective engagement means, adhesive is unnecessary unlike the prior art, and shearing force and undesirable torsion can be prevented at the contact surface. Thus, crack and failure at the contact surface and in its vicinity can be prevented. Additionally, since no adhesive is used, materials of the rubber element and seat elements can be chosen in a wider range. Moreover, a cost can be reduced. Torque is smoothly transmitted between the elements.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Figure 1:
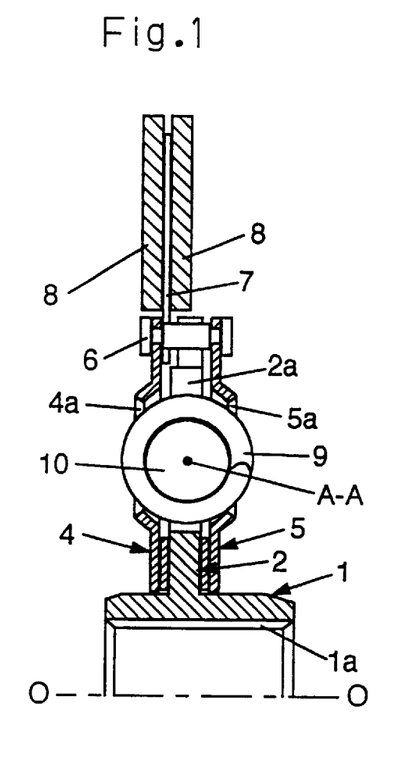
FIG. 1 is a fragmentary, schematic vertical sectional view showing a clutch disc which employs a torsion damper disposed within a coil spring in accordance with a first embodiment of the present invention.
Figure 2:
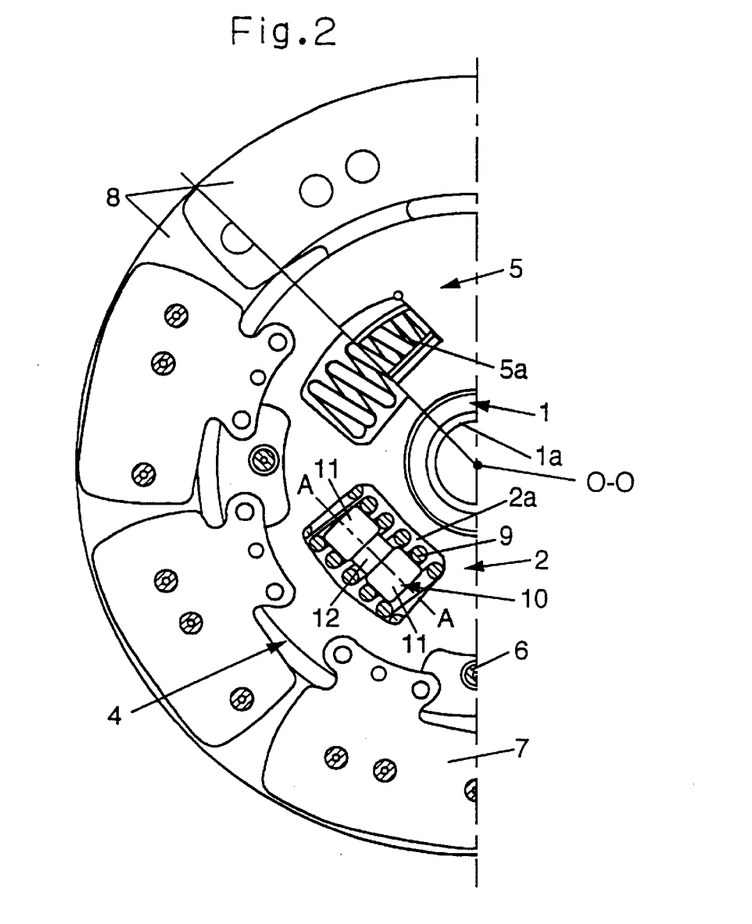
FIG. 2 is a fragmentary, part section, schematic side view showing the torsion damper disposed in the clutch disc depicted in FIG. 1.

FIGS. 1 and 2 depict a clutch disk having vibration dampening capabilities in a preferred embodiment of the present invention. Line O—O is a center axis of rotation.

At the center of the clutch disc, a hub 1 is placed and connected to a transmission shaft (not shown) working as a power output element. The hub 1 has a spline hole 1a at its center and a flange 2 protruding toward an outer circumference. In an outer circumference of the flange 2, four window holes 2a (notches) are formed.

As shown in FIG. 1, a pair of disk-like side plates, a clutch plate 4 and a retaining plate 5, are disposed on opposite sides of the flange 2, and both the plate 4 and 5 are fixed by a plurality of stopper pins 6 (only one is shown in FIG. 1). The pair of side plates 4 and 5 have four window holes 4a and 5a formed in their respective outer circumferences.

A plurality of cushioning plates 7 are coupled to an outer circumferential end of the clutch plate 4 by rivets, and friction facings 8 are attached to opposite surfaces of each of the cushioning plates 7.

In the window holes 2a, 4a and 5a opposed to one another in axial directions, a torsion spring 9 is disposed, keeping its opposite end surfaces in contact with end surfaces defining opposite ends of the window holes 4a and 5a in a circular direction in the clutch plate 4 and the retaining plate 5. The torsion spring 9 is a coil spring and retained so as to expand and contract in response to rotation of the clutch disc.

A torsion damper 10 is concentrically placed inside the torsion spring 9. As shown in FIG. 2, the torsion damper 10 is an assembly of a pair of seat elements 11 displaced at an interval therebetween (in a direction roughly corresponding to the direction of the rotation of the disc) and a rubber element 12 placed between the seat elements 11. The rubber element 12 is capable of expanding and contracting in a direction along the center line A—A of the damper.

In such a disc, torque transmitted from the friction facings to the retaining plates 4 and 5 via the cushioning plates 7 is transmitted to the flange 2 via the torsion spring 9 and the torsion damper 10 intervening between them and is further transmitted to the hub 1 and eventually to the transmission shaft (not shown).

In the transmission as stated above, the seats elements 11 of the torsion damper 10 do not substantially expand or contract but function as seats while the rubber element 12 alone substantially expands and contracts. More specifically, the seat elements 11 keeps the rubber element 12 stably mounting on the end surfaces which define the window holes, and they are also useful to protect the rubber element 12.

Basic operation of the disc and functions of the torsion damper 10 have been mentioned above. The torsion damper 10 will be further described in detail below.

As mentioned above, the torsion damper 10 includes the seat elements 11 and the rubber element 12, and its center line A—A coincides roughly with the direction of the rotation of the clutch disc. The seat elements 11 are roughly cylindrical products made by, for instance, molding nylon 6—6, or any of a variety of similar materials, such as polymers or other generally rigid but relatively light weight materials. While metal materials may be used for the seat elements, nylon material is preferred. Although a wide variety of shapes and patterns of assembling of the seat elements 11 and the rubber element 12 may be employed, they can be assembled without adhesive in any case.

First Embodiment

Figure 3:
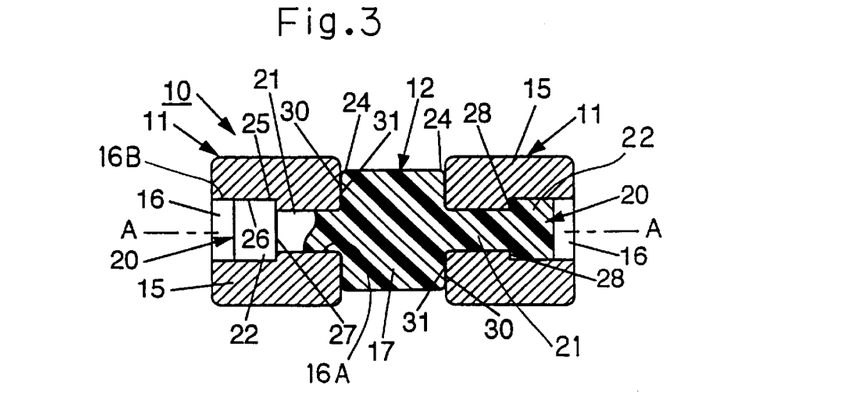
FIG. 3 is a sectional view showing the torsion damper in accordance with the first embodiment of the present invention with the torsion damper shown removed from the damper disk in FIG. 1.

In a first embodiment of the torsion damper 10 illustrated in FIG. 3, the seat elements 11 are respectively, as a whole, made of seat element bodies 15. Each of the seat element bodies 15 is cylindrical in shape, concentric with the center line A—A, and is formed a through-hole 16 (concave portion). The through-hole 16 includes two differing diameter portions, a relatively small diameter portion 16A and a larger diameter portion 16B. The larger diameter portion 16B has an inner surface 26. Between the small diameter portion 16A and the larger diameter portion 16B an annular radially extending surface 28 is defined.

The rubber element 12 includes a rubber element body 17 roughly cylindrical in shape and interposed between the opposite seat bodies 15. The rubber element 12 further includes projections 20 extending from opposite ends of the rubber element body 17 concentric with the center line A—A. However, the rubber element 12 is preferably integrally formed with the rubber element body 17 and the projections 20 formed as a single block of material.

Each of the projections 20 is formed with a stem 21 having a relatively small and constant diameter contiguous to the rubber element body 17 and a head 22 having a relatively large and constant diameter contiguous to a distal end of the stem 21. The stem 21 and head 22 tightly fit in the hole 16. The rubber element body 17 has edges 24 which include chamfered end surfaces.

In such an arrangement, the outer circumferential surface of the stem 21 engages the inner surface of the smaller diameter portion 16A of the hole 16, and an outer circumferencial surface 25 of the head 22 and the inner circumferential surface 26 of the hole 16 make contact with one another, in parallel with the center line A—A. Further the annular surface 27 on the head 22 makes contact with the surface 28 orthogonal to the center line A—A. Moreover, end surfaces 30 of the rubber element body 17 and end surfaces 31 of the seat element bodies 15 are also in contact with one another orthogonal to the center line A—A.

As stated above, no adhesive is used in the contact surfaces; and thus, pairs of the contact surfaces in contact with each other can simply transmit friction force in parallel with them and pushing force perpendicular to them. For example, the contact surfaces 25 of the stem 21 and head 22 and the contact surfaces 26 of the seat element bodies 15 can simply apply friction force in parallel with the center line A—A and pushing force in radial directions of the torsion damper (directions orthogonal to the center line A—A) to each other.

As stated above, contact between several portions permits the seat elements 11 and the rubber element 12 to be always retained with specific correlation in position. For instance, the rubber element 12 is compressed in response to the torque transmitted by the clutch disc and accordingly expands outward in radial directions. Friction forces in parallel with the contact surfaces 27 and 28 and end surfaces 30 and 31 assist in maintaining the integrity of the torsion damper 10. In radial directions primarily a pushing force in radial directions is transmitted via the contact surfaces 25 and 26 in a direction of the center line A—A. In any of the contact surfaces, shearing force and tensile force are hardly transmitted. Thus, stress which tends to cause cracks and local fatigue is no longer concentrated in contact areas and their vicinity.

Second Embodiment

Figure 4:
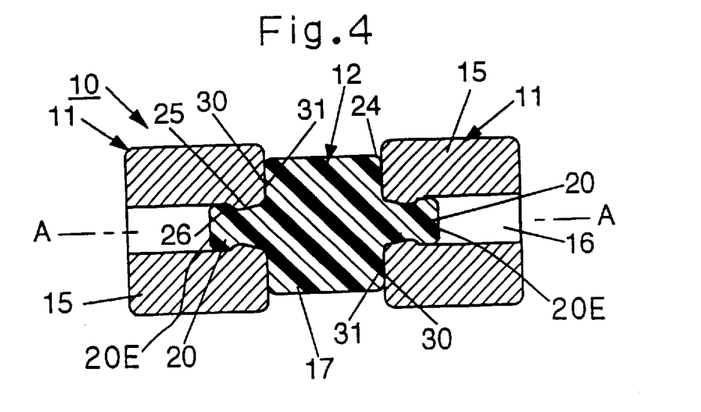
FIG. 4 is a sectional view showing the torsion damper in accordance with a second embodiment of the present invention.

In a second embodiment shown in FIG. 4, the projection 20 is relatively short, has its outer circumferential surface (contact surface 25) almost continually varied in diameter and is the greatest in diameter at its outer most ends 20E. A contact surface 26 of each seat element 11 in contact with the contact surface 25 is sized and shaped corresponding to the contact surface 25. The remaining elements of the torsion damper 10 depicted in FIG. 4 are generally of a similar nature to the elements shown and described with respect to FIG. 3. In the second embodiment depicted in FIG. 4, no adhesive is used so as to attain similar features and effects to those in the first embodiment.

Third Embodiment

Figure 5:
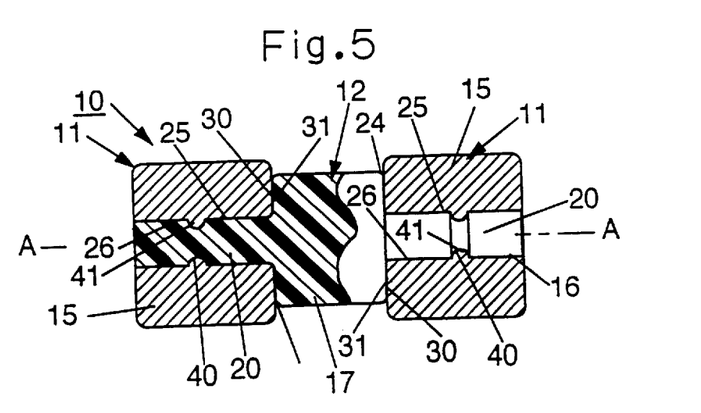
FIG. 5 is a sectional view showing the torsion damper in accordance with a third embodiment of the present invention.

In a third embodiment depicted in FIG. 5, an annular dent 40 is formed in the middle of an elongated extension of the projection 20. The projection 20 is constant in diameter in the remaining portion other than the dent 40. In an inner circumferential surface of a hole 16, an annular protrusion 41 is formed to extend into the dent 40. As can be seen, cross-sections of the dent 40 and the rise 41 are respectively semi-spherical. The projection 20 fits in the entire extension of the hole 16. The remaining elements of the torsion damper 10 depicted in FIG. 5 are generally of a similar nature to the elements shown and described with respect to FIG. 3. In this embodiment, also, features and effects similar to those in the first embodiment can be obtained.

Fourth Embodiment

Figure 6:
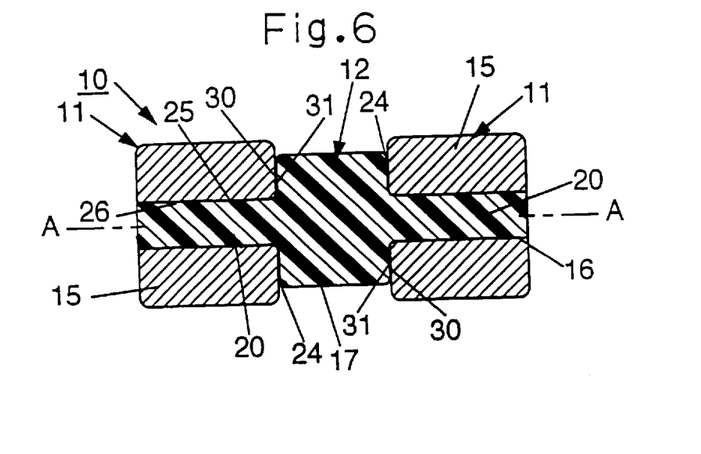
FIG. 6 is a sectional view showing the torsion damper in accordance with a fourth embodiment of the present invention.

A fourth embodiment depicted in FIG. 6 is similar the third embodiment depicted in FIG. 5 except that the dent 40 and the rise 41 as shown in FIG. 5 are omitted. In the fourth embodiment, friction forces alone retain the projection 20 within the hole 16 wherein surfaces 25 and 26 contact one another. The friction force ensures that seat elements 11 and a rubber element 12 are prevented from being dislocated relative to each other, and thus, the same feature and effects as in the above embodiments can be obtained.

Fifth Embodiment

Figure 7:
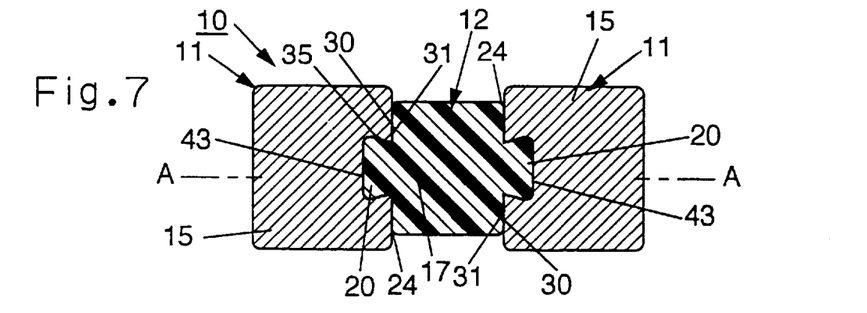
FIG. 7 is a sectional view showing the torsion damper in accordance with a fifth embodiment of the present invention.

In a fifth embodiment shown in FIG. 7, the projection 20 is relatively short and has a tapered outer circumferential surface, contact surface 35. The contact surface 35 is tapered so that its diameter increases toward its distal end. Each seat element 11 is not provided with a through-hole but rather is provided with a concave indent 43 in which the projection 20 fits in tight press-contact.

Sixth Embodiment

Figure 8:
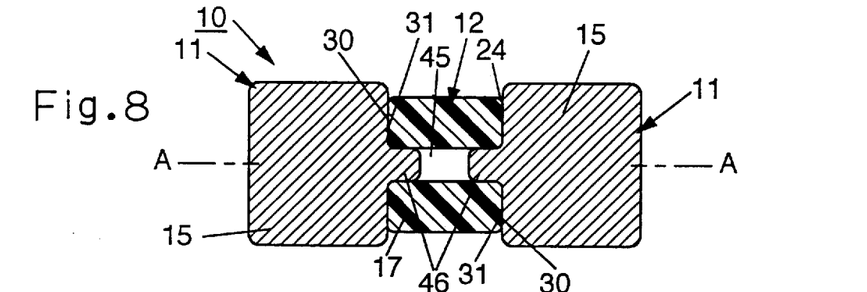
FIG. 8 is a sectional view showing the torsion damper in accordance with a sixth embodiment of the present invention.

In a sixth embodiment shown in FIG. 8, a cylindrically shaped rubber element body 17 is provided with a central through-hole 45. An end surface 31 of each seat element body 15 is integrally provided with a relatively short projection 46. The projections 46 have a generally uniform diameter and extend into the hole 45 in press-contact against it.

In this embodiment, concave and convex members for engagement are reversely configured as compared to the above embodiments. However, generally the same features and effects as in the above embodiments can be obtained.

As has been and will be described in this embodiment and other embodiments below, the overall volume of the rubber element 12 varies from a configuration where the rubber element 12 the extends into the seat elements 15 and where the seat element 15 extends into the rubber element 12. Accordingly, the elastic property of the rubber material may vary due to changes in volume and geometric orientation. Allowing for this, selecting any of the above-mentioned configurations facilitates obtaining various properties of elasticity without great variation in volume, dimensions and shape of the torsion damper 10 as a whole.

Seventh Embodiment

Figure 9:
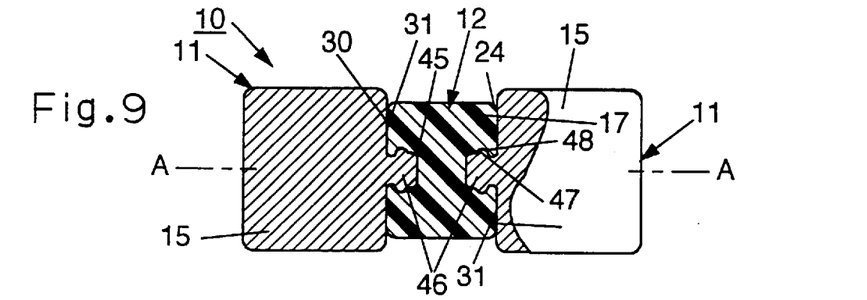
FIG. 9 is a sectional view showing the torsion damper in accordance with a seventh embodiment of the present invention.

A seventh embodiment shown in FIG. 9 is similar to the sixth embodiment shown in FIG. 8 except that the hole 45 does not extend through a rubber element body 17 but is provided as indentations or holes 45 in opposite ends of the rubber element body 17 having sufficient depth so that projections 46 extend therein. An annular groove 47 is provided within each of the holes 45, having a roughly semi-circular cross section. An annular projection 48 is formed on each projection 46 such that the projections conform to the shape of the annular grooves 47. Accordingly, the annular projection 48 fits snugly into the groove 47.

The embodiment configured as mentioned above can attain the same features and effects as in the previous preferred embodiments. Compared with Embodiment 6 in FIG. 8, especially, dislocation between the seat elements 11 and the rubber element 12 in the direction of the center line can be greatly prevented by virtue of the groove 47 and the annular projection 48. Thus, there may be a choice between the sixth and seventh embodiment depending upon operation requirements of the torsion damper 10.

Eighth Embodiment

Figure 10:
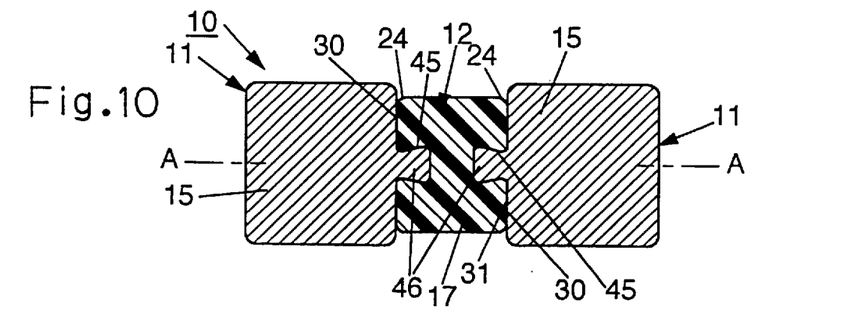
FIG. 10 is a sectional view showing the torsion damper in accordance with an eighth embodiment of the present invention.

An eighth embodiment is depicted in FIG. 10 similar to the embodiment in FIG. 9, and the former is different from the latter simply in that a hole 45 and a projection 46, as a whole, are tapered as shown in FIG. 10.

Ninth Embodiment

Figure 11:
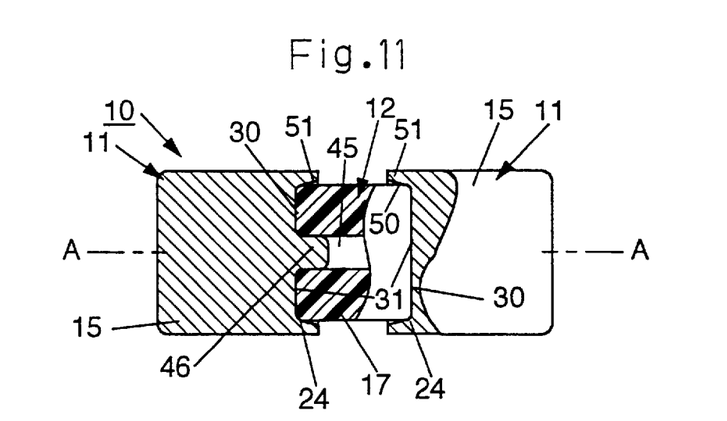
FIG. 11 is a sectional view showing the torsion damper in accordance with a ninth embodiment of the present invention.

In a ninth embodiment shown in FIG. 11, a spherical or rounded surface 50 is formed near the outer circumference of an inner end surface 31 of each seat element body 15. Further, each seat element body 15 includes an extending lip 51, integrally formed with the body 15, the lips 51 extending toward the opposing seat element body 15. The inner circumferential surface 50 is formed on the extending lip 51 such that its shape is concave and partially spherical to be a curved surface contiguous to the outer circumference of the end surface 31 in radial directions. A radius of curvature of the surface 50 is set slight larger than a radius of curvature of an outer circumferential curved surface in an edge 24 of an end surface of a rubber element body 17. Otherwise, the ninth embodiment has a similar configuration to the sixth embodiment depicted in FIG. 8.

In this embodiment, feature and effects as mentioned below are obtained in addition to those attained in the previous embodiments. In the event that the rubber element 12 somehow becomes inclined with respect to the seat elements 11, edges 24 come into contact with the curved surface 50 and thus are retained by the curved surface 50 and the lip 51, preventing pressure and stress from damaging the rubber element 12.

Tenth Embodiment

Figure 12:
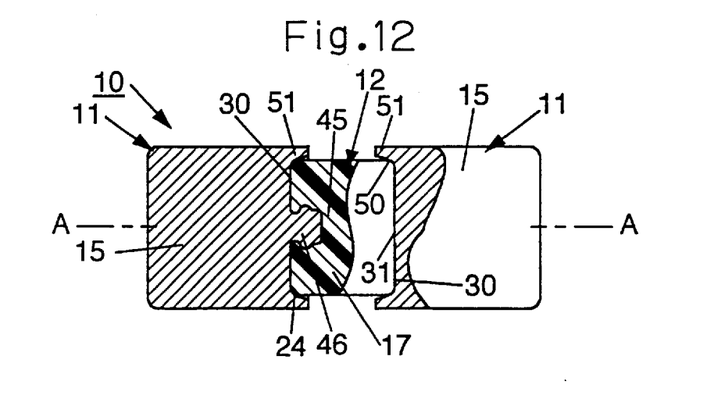
FIG. 12 is a sectional view showing the torsion damper in accordance with a tenth embodiment of the present invention.

An tenth embodiment shown in FIG. 12 is a combination of the configuration described above shown in FIG. 9 and a surface 50 and the lip 51, similar to those elements depicted in FIG. 11, and it can attain generally the same feature and effects as in the previous embodiments.

Eleventh Embodiment

Figure 13:
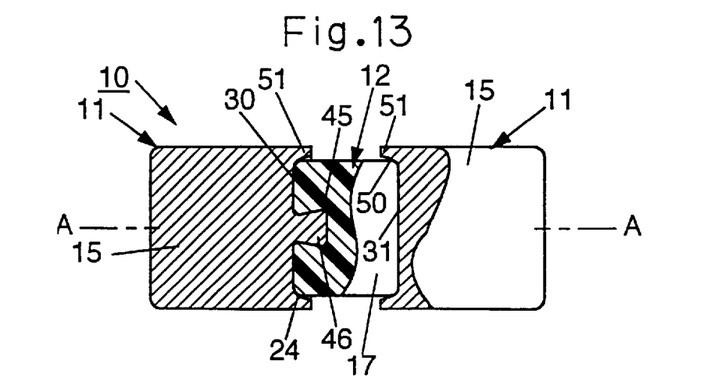
FIG. 13 is a sectional view showing the torsion damper in accordance with an eleventh embodiment of the present invention.

An eleventh embodiment shown in FIG. 13 is a combination of the configuration shown in FIG. 10 and the surface 50 and the lip 51, similar to those depicted in FIG. 11, and can attain generally the same feature and effects as in the previous embodiments.

Twelfth Embodiment

Figure 14:
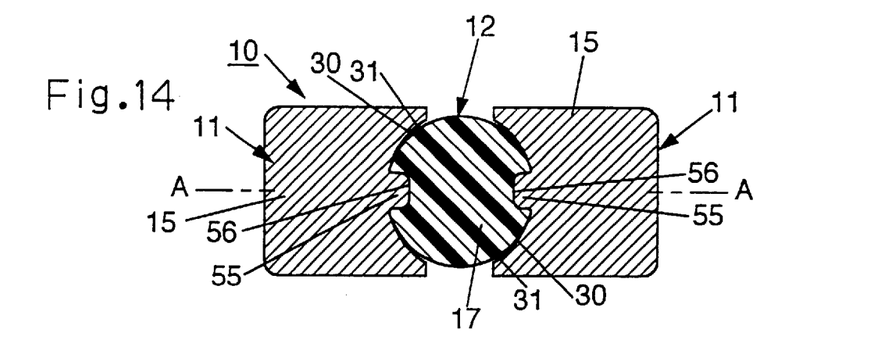
FIG. 14 is a sectional view showing the torsion damper in accordance with a twelfth embodiment of the present invention.

In a twelfth embodiment shown in FIG. 14, a rubber element body 17 has a generally spherical shape and has an end surface 30 that engages a generally spherical concave end surface 31 of each seat element body 15. The generally spherical concave end surface 31 has a radius of curvature set slightly larger than a radius of curvature of the end surface 30 of the rubber element body 17. A projection 55 is provided in each of seat elements 11, and a concave indentation 56 is formed in the rubber element body 17 such that the projection 55 fits in tight contact with the rubber element 12.

In such a configuration, the curved end surfaces 30 and 31 effectively work to permit a relative inclination between the seat elements 11 and the rubber element 12 with little resistance, so that local stress caused by the inclination can be more effectively prevented. Additionally, torque transmission in compression can be smoothly performed.

Thirteenth Embodiment

Figure 15:
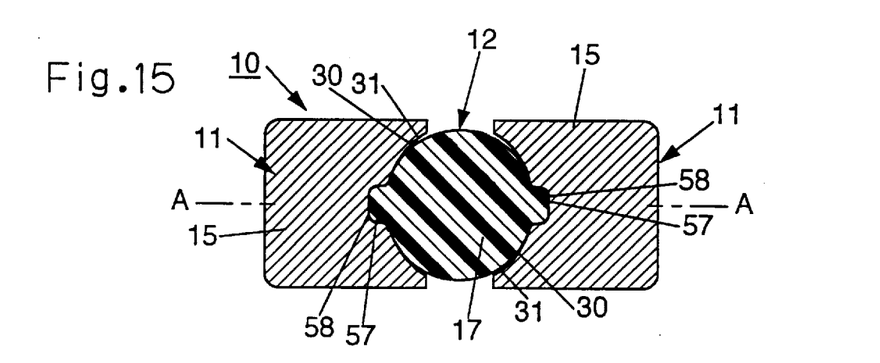
FIG. 15 is a sectional view showing the torsion damper in accordance with a thirteenth embodiment of the present invention.

In a thirteenth embodiment depicted in FIG. 15, curved end surfaces 30 and 31 are formed as in the twelfth embodiment shown in FIG. 14. A projection 57 is provided in a rubber element 12, and a concave indentation 58 is formed in the seat element body 15. The projection 57 fits in tight contact within the concave indentation 58. This embodiment can attain generally the same features and effects as in the twelfth embodiment.

Fourteenth Embodiment

Figure 16:
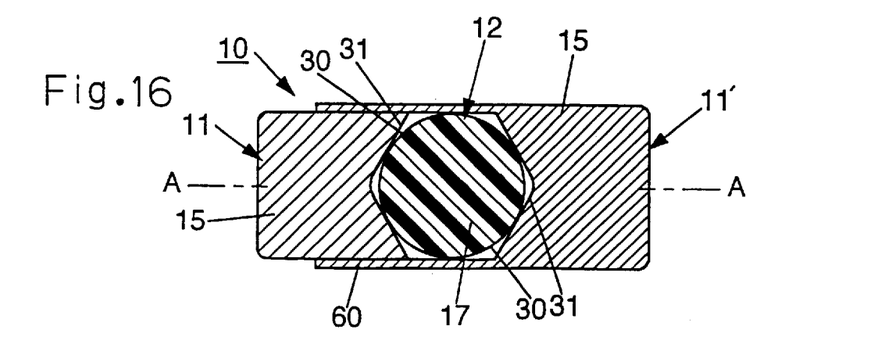
FIG. 16 is a sectional view showing the torsion damper in accordance with a fourteenth embodiment of the present invention.

In a fourteenth Embodiment depicted in FIG. 16, the rubber element 12 has spherical shape while the seat elements 11 and 11' have their respective end surfaces 31 formed with conical concave contours. The seat elements 11' is integrally provided with a cylindrical extension 60 extending from an outer circumference of its seat element body 15 over to an outer circumference of a seat element body 15 of the second seat element 11. With the extension 60 fitted around the outer periphery of the second seat element 11, both the seat elements 11 and 11' are assembled in unity. The rubber element 12 is received in an inner space defined by the extension 60 between the seat element 11 and 11' and is put in contact with an inner circumferential surface of the extension 60 so as to be retained concentric with the seat elements 11 and 11'.

Fifteenth Embodiment

Figure 17:
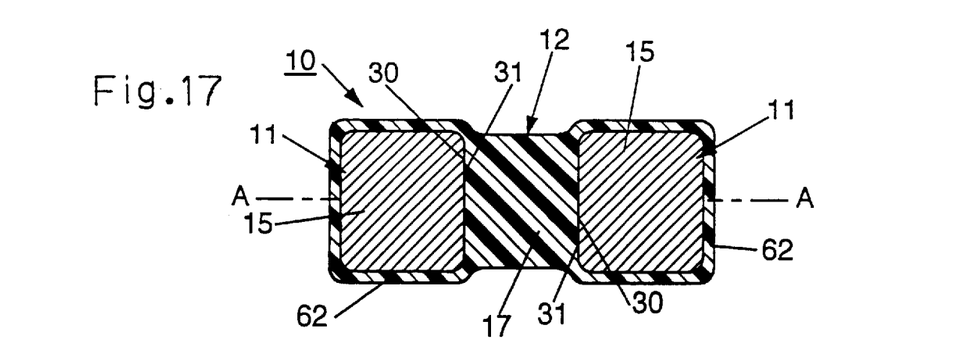
FIG. 17 is a sectional view showing the torsion damper in accordance with a fifteenth embodiment of the present invention.

In a fifteenth embodiment shown in FIG. 17, a rubber element 12 has cylindrical extensions 62 extending from opposite ends of a rubber element body 17 in unity, and the extension 62 enclose the whole of the seat elements 11.

In such a configuration, the seat elements 11 and the rubber element 12 can be more assuredly combined with one another. Additionally, since no adhesive is used between the seat elements 11 and the rubber element 12, the same feature and effects as in the previous embodiments can be obtained.

Sixteenth Embodiment

Figure 18:
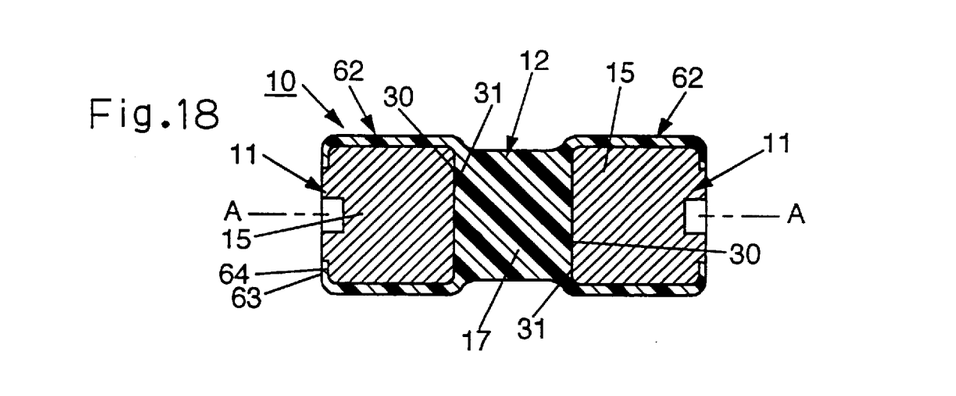
FIG. 18 is a sectional view showing the torsion damper in accordance with a sixteenth embodiment of the present invention.

Although a sixteenth embodiment shown in FIG. 18 is similar to the fifteenth embodiment shown in FIG. 17, they are different in that a distal end of an extension 62 opens and that a distal end 63 directing inward in radial directions fit in a notch 64 provided in an outer circumference in an outer end of each seat element 11. In such a configuration, generally the same features and effects as in the fifteenth embodiment can be attained.

Seventeenth Embodiment

Figure 19:
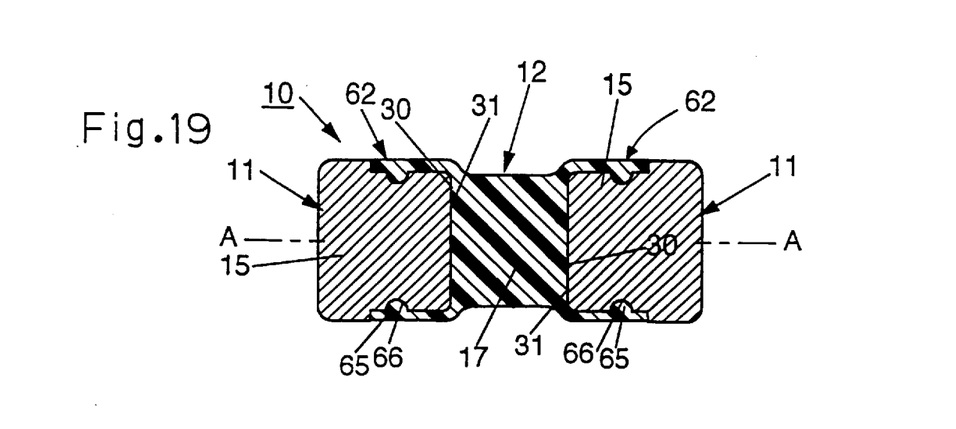
FIG. 19 is a sectional view showing the torsion damper in accordance with an eighteenth embodiment of the present invention.

Although a seventeenth embodiment shown in FIG. 19 is similar to the sixteenth embodiment shown in FIG. 18, an extension 62 is relatively short and its distal end is positioned outside the middle of an elongated extension of each seat element 11. An annular projection 65 having a semispherical cross section is formed in the vicinity of a distal end of the extension 62, and the projection 65 fits in a concave groove 66 shaped correspondingly and formed in an outer circumferential surface of each seat element 11. In such a configuration, generally the same feature and effects as in the fifteenth embodiment can be attained.

Eighteenth Embodiment

Figure 20:
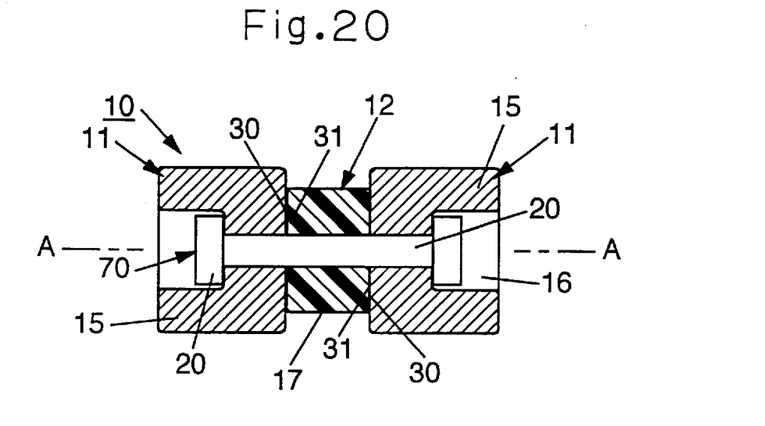
FIG. 20 is a sectional view showing the torsion damper in accordance with a nineteenth embodiment of the present invention.

Although an eighteenth embodiment shown in FIG. 20 is similar to the first embodiment shown in FIG. 3, they are different in that both the projections 20 and an element connecting them in first embodiment corresponds to a single fixed element 70 in this embodiment, and the fixed element 70 is separated from a rubber element body 17 and is similar to a rivet.

In a torsion damper for a clutch disc according to the present invention, undesirable local stress caused by adhesion is prevented from being applied to a rubber element because seat elements and the rubber element can be assembled without adhesive, and thus, durability and reliability of the rubber element can be enhanced. Without adhesion process, fabrication is simplified. In addition to that, since there is a choice of materials for the seat elements and rubber element without allowing for adhesion, they can be chosen in a wider range of materials to obtain the desired operation characteristic.

Engagement of the seat elements and rubber element is ensured in the event that a convex portion of an engaging element for engaging both the elements is comprised of a stem and a head or that a groove is provided in one of the convex portion or a concave portion while a lip or protrusion is provided in the other. The engagement of both the elements is similarly ensured in the event that the convex and concave portions are tapered.

Forming the convex portion for the engagement element as a through-hole facilitates fabrication.

In the event that the rubber element is spherical in shape while the seat elements have their respective end surfaces shaped in concave curved surfaces, an automatic aligning function works during the operation to smoothly transmit torque between the rubber element and the seat elements.

In a torsion damper for a clutch disc in another aspects of the present invention, since seat elements are buried inside a cylindrical extension provided in a rubber element, adhesion is needless between these elements to attain the same effects as the above.

Engagement of the rubber element and seat elements is further ensured in the event that a protrusion is provided in an inner circumferential surface of the cylindrical extension while a groove is provided in an outer circumferential surface of each seat element.

In a torsion damper for a clutch disc in still another aspect of the present invention, since a rubber element and seat elements are fixed by a fixing element, adhesive is useless similar to the above, and moreover, both the elements are assuredly fixed to each other.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A torsion damper for a clutch disc comprising:

a pair of seat elements, each of said seat elements having a generally cylindrical shape having a first length measured along a central axis thereof;

an elastic non-metallic element disposed between said seat elements, said elastic non-metallic element in engagement with said seat elements in the absence of an adhesive, limiting relative movement between said seat elements and said elastic non-metallic element, and said elastic non-metallic element having a central portion disposed between said pair of seat elements having a second length measured along a central axis thereof, said first length being greater than said second length;

wherein said elastic non-metallic element includes axial extensions which extend completely around each of said seat elements.

2. A torsion damper for a clutch disc comprising:

a pair of seat elements, each of said seat elements having a generally cylindrical shape having a first length measured along a central axis thereof;

an elastic non-metallic element disposed between said seat elements, said elastic non-metallic element in engagement with said seat elements in the absence of an adhesive, limiting relative movement between said seat elements and said elastic non-metallic element, and said elastic non-metallic element having a second length measured along a central axis thereof, said first length being greater than said second length;

wherein said elastic non-metallic element includes axial extensions which extend around at least of portion of each of said seat elements and said axial extensions are formed with annular protrusions which extend radially inwardly into corresponding grooves formed in said seat elements.

* * * * *